May 4, 1971 E. R. DERROUGH 3,577,333
APPARATUS FOR ELECTROCHEMICAL REMOVAL OF MATERIAL
FROM AN ARTICLE
Filed Sept. 24, 1968 5 Sheets-Sheet 1

INVENTOR.
EDWARD R. DERROUGH
BY
Plante, Arens, Hartz and O'Brien
ATTORNEYS

INVENTOR.
EDWARD R. DERROUGH
BY
Plante, Arens, Hartz and O'Brien
ATTORNEYS

INVENTOR.
EDWARD R. DERROUGH
BY
Plante, Arens, Hartz and O'Brien
ATTORNEYS

INVENTOR.
EDWARD R. DERROUGH
BY
Plante, Arens, Hartz and O'Brien
ATTORNEYS

United States Patent Office 3,577,333
Patented May 4, 1971

3,577,333
APPARATUS FOR ELECTROCHEMICAL REMOVAL OF MATERIAL FROM AN ARTICLE
Edward R. Derrough, South Bend, Ind., assignor to The Bendix Corporation
Filed Sept. 24, 1968, Ser. No. 761,966
Int. Cl. B23p 1/04, 1/12
U.S. Cl. 204—212                    4 Claims

ABSTRACT OF THE DISCLOSURE

An electrochemical machining apparatus having a hollow electrode tool with a working face for eroding a core of material from a workpiece in response to a rotational input.

BACKGROUND OF THE INVENTION

Heretofore, the electrochemical machining of blind holes has been limited to small sizes, due to the time and electrical power required to remove large quantities of metal by electrolysis.

This invention relates in general to electrochemical machining, and specifically, to a method and apparatus for producing a large of small blind radial annulus in soft or hardened conductive materials by electrochemical dissolution, which then allows removal of the remaining core of material to form the required hole. This invention is, of course, most valuable in machining conductive metalloids that are not readily machinable by ordinary methods or conventional cutting tools; however, it is felt that the invention may be used for any application where a blind radial annulus is required.

It is now well known that electrochemical machining consists of advancing an electrode tool toward and into a workpiece while electrolyte is supplied under pressure to the interface between the working face of the electrode tool and the workpiece. A direct current source of reasonably low voltage potential but high amperage capacity is connected to the electrode tool and the workpiece so as to make the electrode tool a cathode and the workpiece an anode. The electrolyte action thus produced rapidly removes material from the anodic workpiece in front of the working face of the advancing electrode tool. The material removed goes into solution with the electrolyte and is vented from the eroding working area by the flowing electrolyte.

The possibility of a damaging short circuit between the cathodic tool and the anodic workpiece exists in all electrochemical operations, but especially in operations where a core or slug of material is to be removed. A short circuit can occur when a hollow electrode breaks partially through the workpiece and into a conduit which permits the electrolyte to flow suddenly through said conduit so as to create an electrolyte shortage or starvation at the gap between the electrode tool working face and the remaining metal of the workpiece that is to be eroded away. Consequently, the electrode tool advances at a faster rate than the metal can be eroded away from the workpiece, causing a short circuit when contact is made between the electrode tool working face and the workpiece. Further, a short circuit can occur when the electrode breaks partially through the workpiece so as to allow a partially severed core or plug to drop or lodge against the working face of the electrode tool.

SUMMARY OF THE INVENTION

It is an object of this invention to provide a method and apparatus for electrochemically machining large or small blind radial annuluses and holes.

Another object of this invention is to provide a method and apparatus which prevents short circuits in electrochemical machining.

A further object of this invention is to provide an apparatus that facilitates more efficient removal of the eroded material during the electrochemical machining.

Still another object of this invention is to provide an electrode tool which minimizes the time required for the machining operation.

Other objects and features of the invention will be apparent from the following description of the electrochemical material removal process and apparatus therefor taken in connection with the accompanying drawings.

DESCRIPTION OF THE PREFERRED EMBODIMENT

Figure 8:
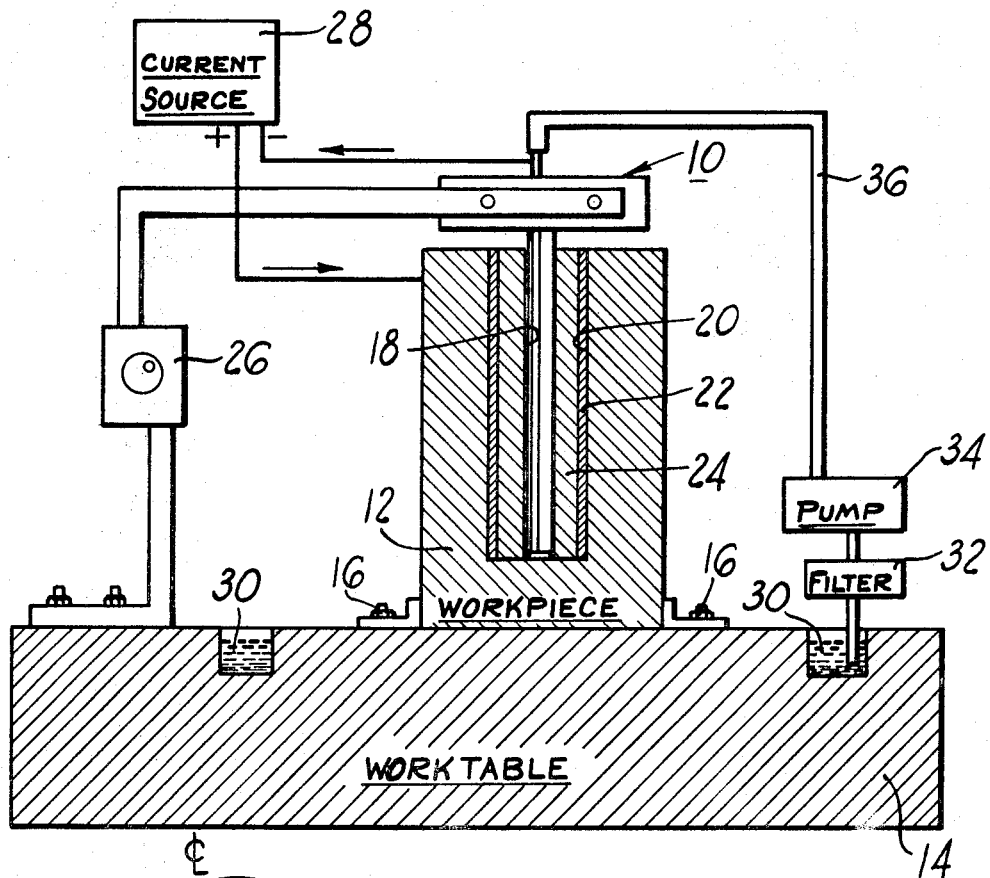
FIG. 8 is a sectional view of the electrochemical material removal apparatus shown in its operable environment with respect to a workpiece and worktable.

Referring now to the drawings, and specifically FIG. 8; there is shown a sectional view of the electrochemical material removal apparatus represented by the numeral 10 and shown in its operable environment with respect to a workpiece 12 and a worktable or machine 14. The workpiece 12 is rigidly secured to the worktable 14 by fastening means 16. As shown, the workpiece 12 has a pilot hole 18 surrounded by a concentric trepanned bore 20. The bore 20 has inserted therein a means 22 to maintain a spaced relationship between a core 24 and the workpiece 12 to prevent loss of electrolyte pressure and hold the core 24 rigidly in place during the electrochemical machining operation. A conventional means 26 is rigidly attached to the worktable and the material removal apparatus 10 for providing axial adjustability of the material removal apparatus 10 with respect to the pilot hole 18 of the workpiece 12. A current source 28 is provided for cooperation with the material removal apparatus 10 to be explained more fully hereinafter. Moreover, an electrolyte 30, suitably cleansed by the filter 32, is provided under pressure developed by the pump 34 to the material removal apparatus 10 by means of the conduit 36.

Figure 1:
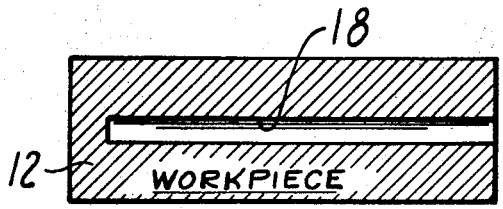
FIGS. 1, 2, 3, 4, and 5, depict the process steps necessary to produce a closed end hole in a workpiece.
Figure 1A:
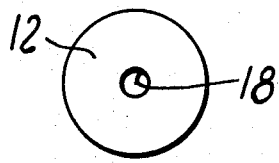
FIGS. 1A, 2A, 3A, 4A, and 5A depict end views of FIGS. 1, 2, 3, 4, and 5, respectively.
Figure 2:
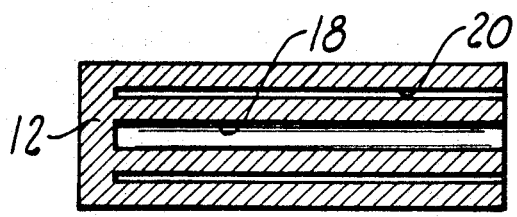
Figure 2A:
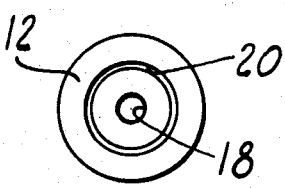
Figure 3:
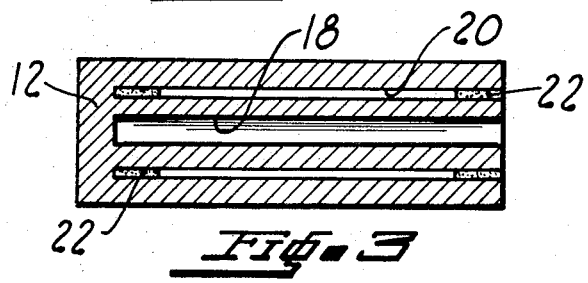
Figure 3A:
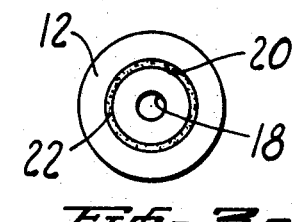
Figure 4:
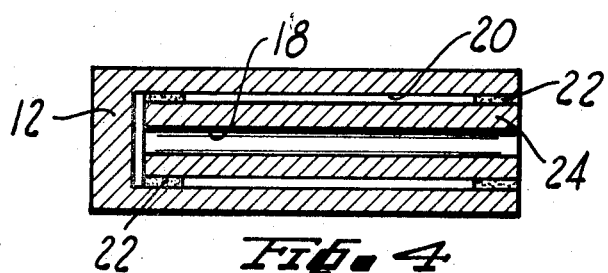
Figure 4A:
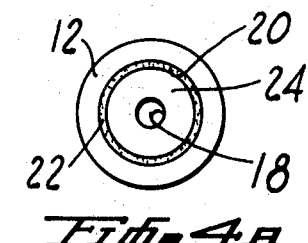
Figure 5:
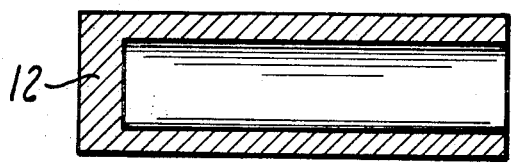
Figure 5A:
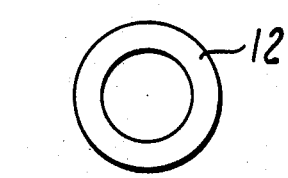

With the above understanding of the components necessary to accomplish the process, reference now is made to FIGS. 1, 2, 3, 4, and 5 which depict the process steps necessary to produce a blind or closed radial annular hole in a workpiece. The workpiece from which material is to be removed may be of a soft or a hardened material. FIG. 1 depicts the workpiece 12 and shows a pilot hole 18 therein which may be obtained either by electrochemical or mechanical drilling. FIG. 2 shows a trepanned bore 20 concentric with the pilot hole 18. The bore may again be acquired either electrochemically or mechanically. FIG. 3 shows a low temperature eutectic alloy material 22 inserted in the trepan bore 20. The means 26 for providing axial adjustability is then used to position the material removal apparatus axially with respect to the pilot hole 18. The material removal apparatus 10 is then operated as explained more fully hereinafter to separate the core 24 from the workpiece proper 12 as shown best in FIG. 4. After removal of the apparatus 10 from the pilot hole 18 the core 24 remains in contact with the workpiece 12 as a result of the bonding action from means 22. The workpiece 12 is then heated to a temperature that melts the means 22 so as to allow the core 24 to slide out of the workpiece 12, as seen in FIG. 5. As may be seen by those skilled in the art, the identical process may be repeated using a progressively larger diameter material removal apparatus to eventually acquire the desired diameter hole.

Figure 6:
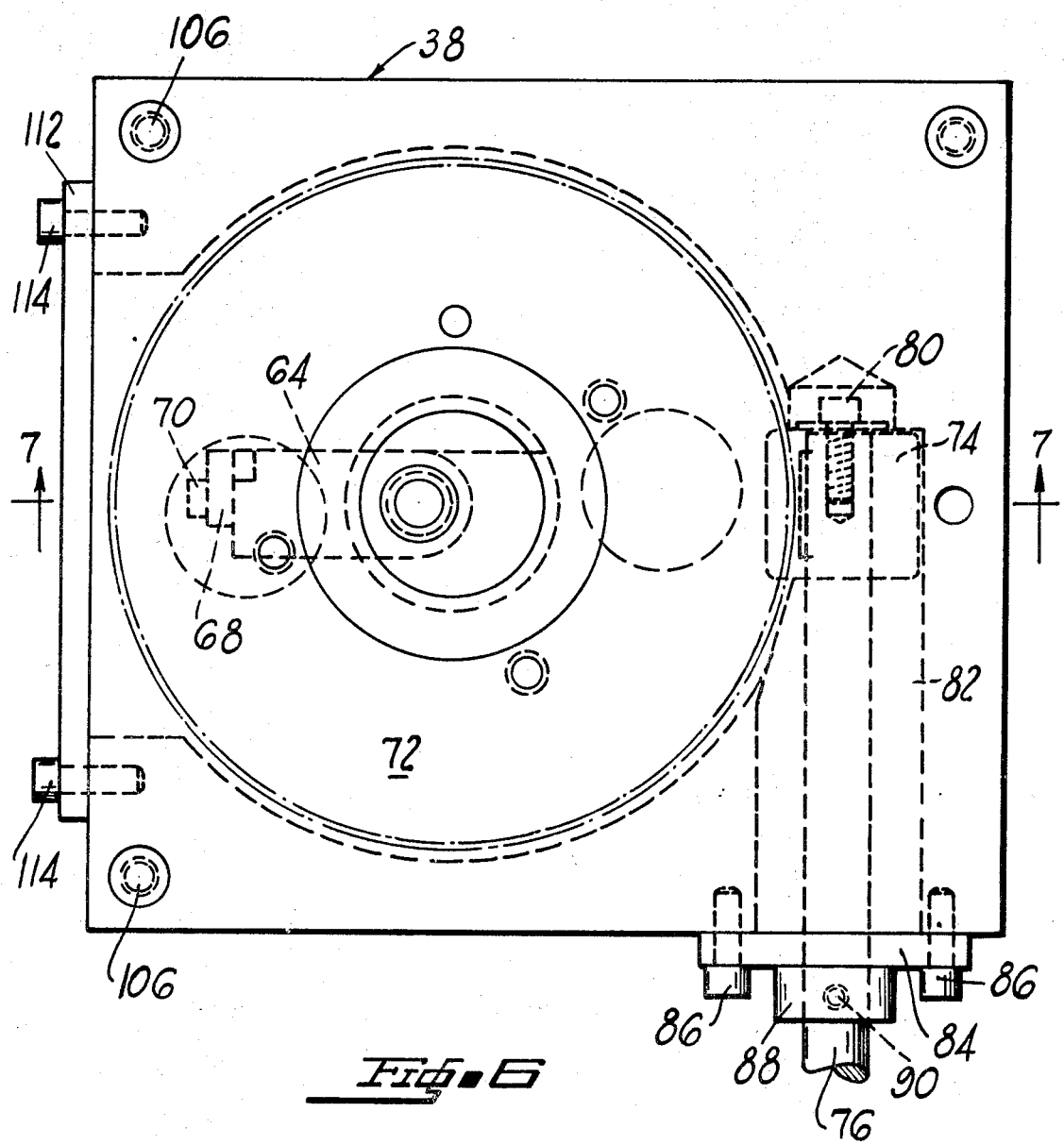
FIG. 6 is a plan view of the electrochemical material removal apparatus.
Figure 7:
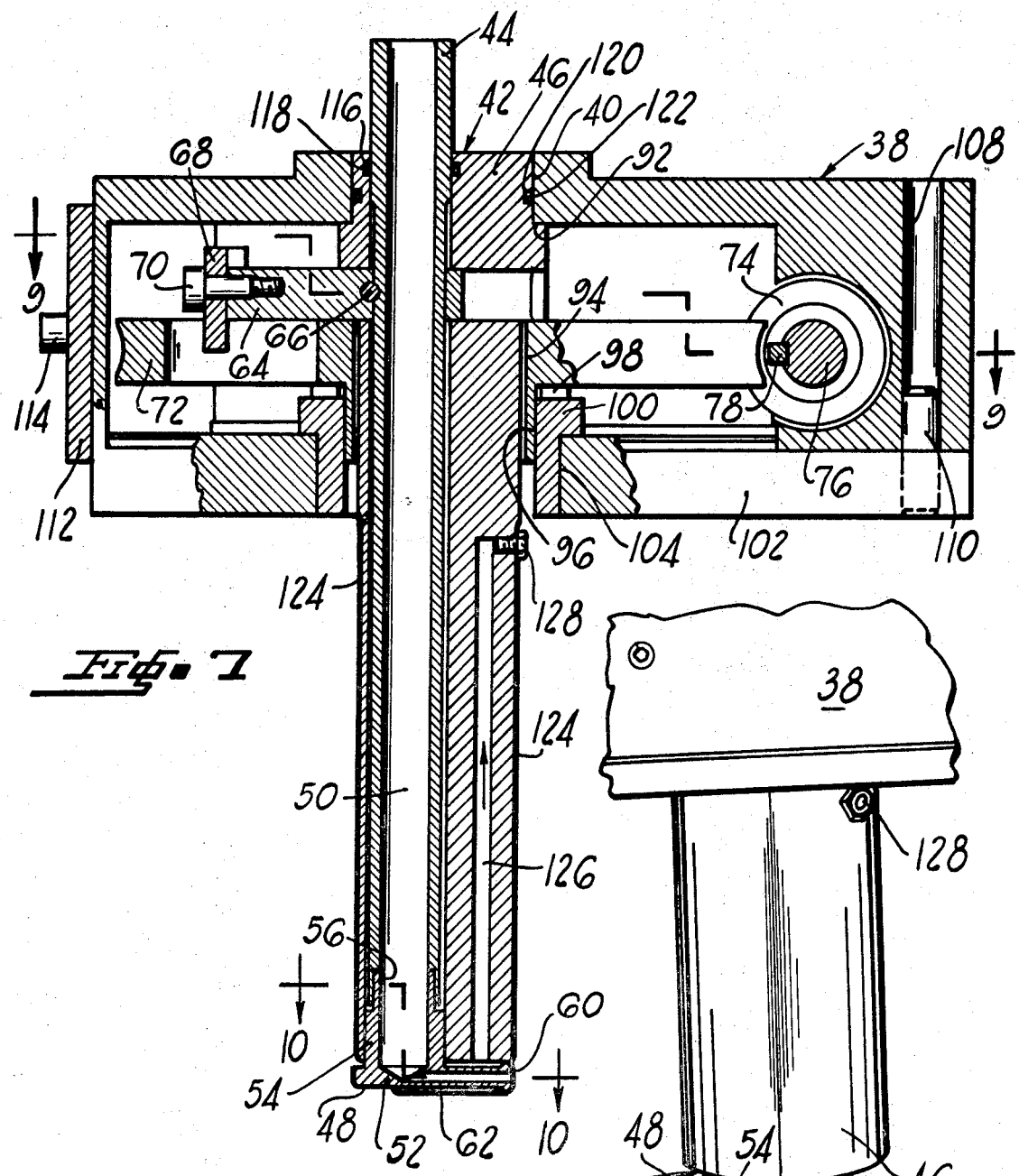
FIG. 7 is a sectional view taken along line 7—7 of FIG. 6.

Referring now to FIGS. 6 and 7, the electrochemical material removal apparatus 10 is comprised of a housing 38 having a bore 40 rotatably receiving a hollow electrode tool 42. The hollow electrode tool includes an inner shaft 44 and an outer shaft 46 having an eccentric relationship therebetween. The inner shaft 44 has attached to one end a working face 48 and is connected on its other end to conduit 36 to communicate the electrolyte under pressure through bore 50 of the inner shaft and to the working face 48.

Figure 10:
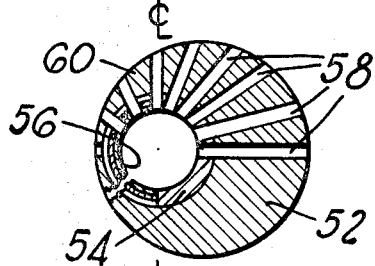
FIG. 10 is a sectional view taken along line 10—10 of FIG. 7.

Referring now to FIGS. 7 and 10, the working face includes a disc means 52 having an eccentric axial plug 54. The plug 54 has a bore 56 and is operably connected to the inner shaft 44 in any suitable manner, such as by soldering, so as to withstand the reasonably high pressure of the electrolyte fluid.

The disc means 52 has a plurality of passages 58 connected to the bore 56 and venting at the outer periphery 60 of the disc means 52 so as to form an involute curvature. Thus, the electrolyte 30 flows from the outer periphery 60 and forms an involute wave front of fluid as seen by the workpiece during the material removal process. It is noted that the involute curvature as formed on the outer periphery 60 may be varied so as to optimize same for the particular type of material being machined. It has also been found that the rate of material dissolution is a function of the curvature of electrolyte flow as presented to the workpiece. As is conventional in the art, the disc means 52 is externally coated with an insulator 62 with the exception of the outer periphery 60 which is intended to be highly conductive.

As will be understood by those skilled in the art, the electrolyte fluid is generally a water solution that carries a current. More specifically, electrical conductivity of the water may be materially assisted by the addition of salts, mineral acids, caustic potash, or caustic soda. The electrode tool 42 and more specifically the working face 48 are cathodic while the workpiece is anodic. The current source 28 is connected to the workpiece 12 and the inner shaft 44 of the hollow electrode tool 42 so as to allow current to flow from the workpiece 12 to the outer periphery 60 of the working face 48, in the presence of electrolyte 30 flow under pressure. The electrical energy starts a chemical reaction in the electrolyte solution which results in the formation of gas at the tool and dissolvement of metal from the workpiece. The gas vents into the atmosphere, and the dissolved metal from the workpiece 12, is carried away in the flowing solution of electrolyte 30 under pressure. It is desirable to have a swift flow of the electrolyte fluid 30 to carry away the particles of dissolved metal as well as carry away heat generated at the machining surface during the dissolution process. The pressure of the electrolyte 30 or the speed with which it flows as well as the amount of current flowing between the workpiece and the electrode to it, may be varied for optimizing the cutting speed or material dissolution for any particular application.

Figure 9:
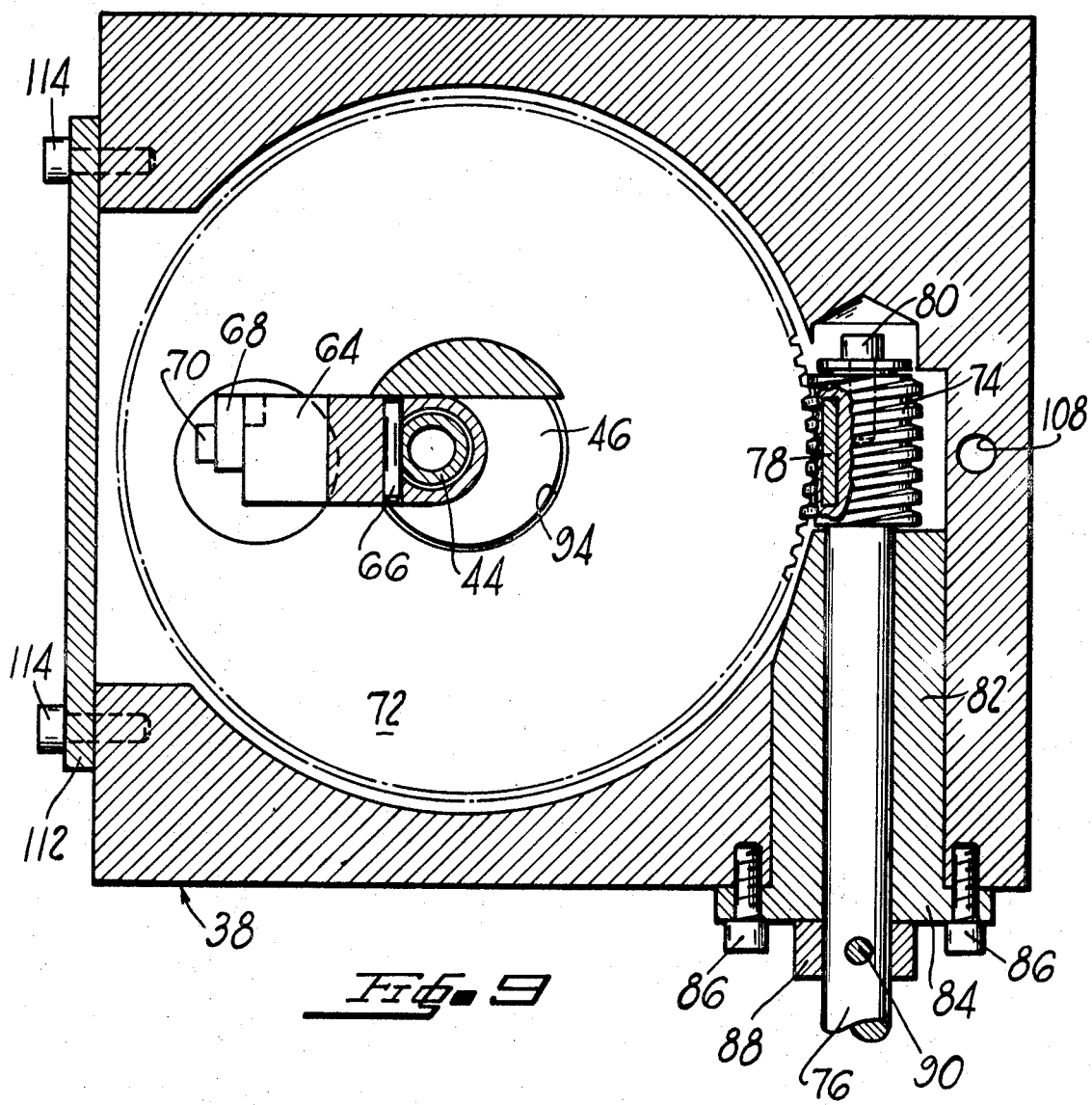
FIG. 9 is a sectional view taken along line 9—9 of FIG. 7.

Referring now to FIGS. 6, 7, and 9, the inner shaft 44 have a lever means 64 rigidly connected thereto by pin 66 so as to limit axial movement of the inner shaft 44 with respect to the outer shaft 46. The lever means 64 has a coupling means 68 rigidly attached to its end by a screw 70. The coupling means 68 projects axially into a spur gear 72 and is rotationally responsive to rotation of the spur gear 72 by worm gear 74. The worm gear 74 is rigidly fastened to shaft 76 by key 78 and retainer means 80. The shaft 76 is carried in sleeve 82 having a flange 84 which is suitably mounted to the housing 38 by bolts 86. The shaft 76 is further equipped with a collar 88 and set screw 90 for fastening the collar to the shaft to preclude excessive axial freedom of the shaft 76 with respect to the sleeve 82 and housing 38. Thus, it can be seen that the inner shaft 44 is rotatably responsive through the above-described linkage to a rotational input to the shaft 76.

The outer shaft 46 has a flange 92 for axial engagement with the housing 38 to limit its axial movement in one direction. As can be seen best in FIG. 7, the spur gear 72 has a bore 94 so that it may be installed slidably on said outer shaft 46 so as to axially engage said lever means 64. Said spur gear 72 further includes an annular axial flange portion 96 which slidably receives a spacer member 98 and bushing 100. A cover plate 102 having a bore 104 is slidably positioned over the bushing 100 and secured by fastening bolts 106 so as to limit the axial movement of the electrode tool and specifically the outer shaft 46 on its other end. It is further noted that housing 38 may have a bore 108; and the cover plate 102 a locating pin 110, to minimize tolerance buildup associated with the bore 104 of the cover plate 102 relative to the electrode tool 42. A side plate 112 is suitably secured to the housing 38 by means of fastening bolts 114 to exclude outside contaminants from the linkage intermediate the hollow electrode tool 42 and the rotational input to shaft 76.

The outer shaft 46 has an inner annular groove 116 for receiving an inner seal member 118 which cooperates with the inner shaft 44 to accomplish a seal against pressurized fluid. The outer shaft 46 further has an outer annular groove 120 for receiving an outer seal member 122, which in cooperation with the housing 38, provides a seal.

The outer shaft 46 is further coated with an insulating means 124 over its entire surface so that it will not conduct current flowing from the anodic workpiece 12 to the cathodic hollow electrode tool 42. Thus, it can be seen that the working face 48 and inner shaft 44 are intended to carry all the current provided by the workpiece 12 to thus avoid any high resistance electrical conductivity paths.

The outer shaft 46 may be further provided with a passage 126 and a plug 128 therein for controlling back pressure on and the flow of electrolyte fluid 30 away from the working area of the working face 48. The size or diameter of the passage and the orifice of the plug 128 may be predetermined in accordance with a specific application; however, as a general rule the passage 126 and plug 128 will represent a smaller electrolyte flow area than will the combined flow area of the plurality of passages 58. As can be seen then, plug 128 may have almost any size orifice for use with different applications. If it is desirable to eliminate the need for a passage and the plug, the outside diameter of the outer shaft 46 may be predetermined with respect to the diameter of the pilot hole 18 to provide for escapement of the electrolyte fluid 30 around the entire periphery of the outer shaft 46.

MODE OF OPERATION OF THE PREFERRED EMBODIMENT

It is assumed that the workpiece 12 has been properly prepared with a pilot hole 18, a concentric trepanned bore 20, which has been appropriately filled with the low temperature eutectic alloy material 22 to maintain the spaced relationship and preclude loss of electrolyte 30 during the machining operation, and that the workpiece 12 has been properly mounted on the worktable 14.

The electrochemical material removal apparatus 10 is then suitably fastened to the axial adjustability means 26.

The inner shaft 44 of the hollow electrode tool 42 is connected to conduit 36 for receiving electrolyte 30 under pressure. Further, the positive lead of the current source 28 is connected to the workpiece and the negative lead thereof is connected to inner shaft 44 of the electrochemical removal apparatus 10.

The hollow electrode tool 42 and specifically the working face 48 of the electrochemical removal apparatus 10 is then axially lowered into the pilot hole 18 by the axial adjustability means 26 to a predetermined depth, as can be seen in FIG. 8.

Figure 12:
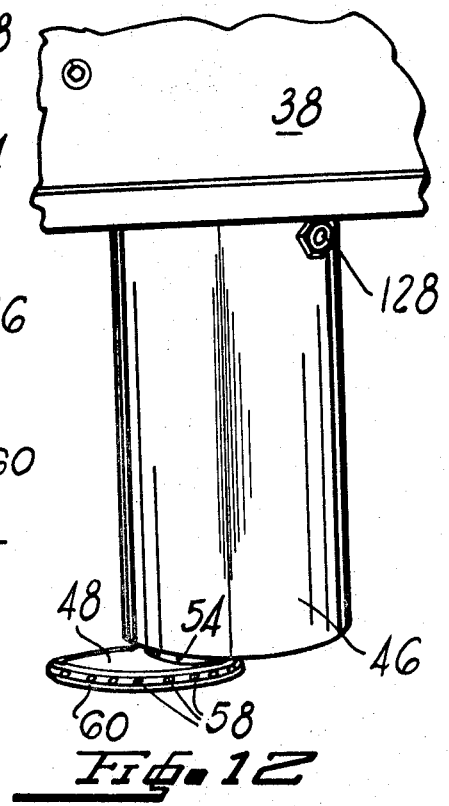
FIG. 12 is a fragmented isometric view of the electrode tool having its working face in the same position shown in FIG. 11.
Figure 11:
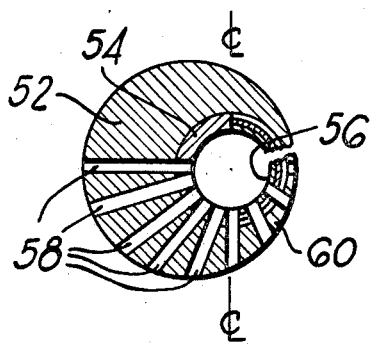
FIG. 11 is a sectional view identical to that shown in FIG. 10 but having the working face of the electrode tool rotated through 180 degrees.

The eccentric relationship of the inner shaft 44 and the outer shaft 46 and the starting position of the working face 48 are depicted in FIG. 7. To intiate the machining or material erosion of the workpiece, the pump 34 is energized to provide pressurized electrolyte 30 to the material removal apparatus 10. Upon energizing the current source 28 current begins to flow between the anodic workpice 12 and the cathodic inner shaft and working face 48. The flow of current and electrolyte fluid 30 initiate dissolution of material from the workpiece, which, as previously mentioned, is carried away from the working area by the expelling flow of electrolyte. As material is eroded from the workpiece 12 it is desirable to rotationally advance the working face 48 to keep it in close proximity to the workpiece 12. Rotation of the working face 48 is accomplished by providing a clockwise rotational input to shaft 76 and worm gear 74, as seen in FIG 7. The worm gear 74 rotates the spur gear 72 counterclockwise as seen in FIG. 9 thus causing the lever means 64 and inner shaft 44 to rotate through approximately 180° until the lever means 64 engages abutment surface 97 of the outer shaft 46. As can be seen in FIGS. 11 and 12 the inner shaft rotation will have caused working face 48 to also rotate through approximately 180°. At this point the working face 48 will have been displaced 180° from its position shown in FIG. 7. Further clockwise rotation of the input shaft 76 will cause the gearing to rotate the lever means 64 the inner shaft 44 and the outer shaft 46 together, thus keeping the outer periphery 60 of the working face 48 extended at its furthermost radial distance from the outer shaft 46 through the remaining rotation necessary to separate the core 24 from the workpiece 12. To accomplish tool removal the input shaft 76 can be rotated counterclockwise which will cause the lever means 64 and inner shaft 44 to assume their initial position thus the outer diameter of the working face will be concentric with the outer diameter of the outer shaft 46 and the tool may be removed readily from the pilot hole 18.

Furthermore, although this invention has been described in connection with a specific embodiment, it will be obvious to those skilled in the art that various changes may be made in the form, structure and arrangement of components without departing from the scope of the invention.

I claim:

1. An electrochemical material removal apparatus for separating a core of material from a workpiece having a pilot hole and a trepanned bore concentric with said pilot hole comprising:
    a means for holding said workpiece;
    a source of electrolyte fluid under pressure;
    a hollow electrode tool for electrochemically eroding said core from said workpiece;
    inner and outer shafts having an eccentric relationship therebetween;
    a means for axially positioning said hollow electrode tool with respect to said pilot hole;
    said hollow electrode tool operatively connected to said source of electrolyte fluid;
    said hollow electrode tool having a working face with at least one electrolyte passage therethrough for supplying electrolyte to said working face;
    said inner shaft being operatively attached to said working face;
    a source of electric current electrically connected to the workpiece and said hollow electrode tool to make said workpiece predominantly anodic and said tool predominantly cathodic;
    said hollow electrode tool being rotatably responsive to an input so as to rotate said working face through approximately 360 degrees to thereby separate said core from said workpiece;
    linkage means operatively connected to said inner shaft and responsive to said input for rotating said working face;
    said outer shaft having a surface against which said linkage abuts after a predetermined amount of inner shaft rotation, causing said outer shaft to rotate with said inner shaft; and
    a means inserted in said trepanned bore to prevent loss of electrolyte pressure while said core is being separated from said workpiece.

2. A hollow electrode tool as recited in claim 1, wherein said outer shaft includes a vent means for communicating the eroded material in solution with the electrolyte fluid away from around said working face.

3. An electrochemical material removal apparatus as recited in claim 1, wherein said means inserted in said trepanned bore is a low temperature eutectic alloy material.

4. An electrochemical material removal apparatus as recited in claim 1, wherein said working face comprises:
    a disc means having an eccentric axial plug;
    said plug having a bore and being operatively connected to said hollow electrode tool;
    said disc means having a plurality of passages connected to said bore and venting at the outer periphery of said disc so as to form an involute curvature of electrolyte flow as presented to the workpiece during material removal.

References Cited

UNITED STATES PATENTS

| 3,058,895 | 10/1962 | Williams | 204—143 |
| 3,247,087 | 4/1966 | Gauthier | 204—143 |
| 3,306,838 | 2/1967 | Johnson | 204—143 |
| 3,329,596 | 7/1967 | Abt et al. | 204—143 |

FREDERICK C. EDMUNDSON, Primary Examiner

U.S. Cl. X.R.

204—143, 224